United States Patent
Shih

(10) Patent No.: US 10,552,101 B1
(45) Date of Patent: Feb. 4, 2020

(54) SYSTEM AND METHOD FOR AUTOMATED GENERATION AND INSTALLATION OF MFP APPLICATIONS FROM MONITORED DEVICE USAGE

(71) Applicant: Toshiba TEC Kabushiki Kaisha, Shinagawa-ku (JP)

(72) Inventor: Kevin C. Shih, Irvine, CA (US)

(73) Assignee: Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 16/173,360

(22) Filed: Oct. 29, 2018

Related U.S. Application Data

(60) Provisional application No. 62/714,194, filed on Aug. 3, 2018.

(51) Int. Cl.
*H04N 1/00* (2006.01)
*G06F 3/12* (2006.01)
*G06F 8/61* (2018.01)

(52) U.S. Cl.
CPC ............ *G06F 3/123* (2013.01); *G06F 3/1204* (2013.01); *G06F 3/1287* (2013.01); *G06F 8/62* (2013.01); *H04N 1/00007* (2013.01); *H04N 2201/0094* (2013.01)

(58) Field of Classification Search
CPC .......... G06F 3/123; G06F 8/62; G06F 3/1204; G06F 3/1287; H04N 1/00007; H04N 2201/0094

USPC ........................................................ 358/1.15
See application file for complete search history.

(56) References Cited

U.S. PATENT DOCUMENTS

| | | |
|---|---|---|
| 6,959,437 B2 | 10/2005 | Sharp |
| 8,271,967 B2 | 9/2012 | Ricoh |
| 2006/0117312 A1 | 6/2006 | Seo |
| 2007/0011726 A1* | 1/2007 | Choi .................. H04N 1/32128 726/5 |
| 2015/0153976 A1* | 6/2015 | Srinivasmurthy .... G06F 3/1204 358/1.15 |
| 2016/0226952 A1 | 8/2016 | Ricoh |
| 2016/0274832 A1* | 9/2016 | Nishida ................. G06F 3/1219 |

* cited by examiner

*Primary Examiner* — Saeid Ebrahimi Dehkordy
(74) *Attorney, Agent, or Firm* — Ulmer & Berne LLP

(57) ABSTRACT

A system and method provides for monitoring of popular multifunction peripheral instruction sequences for generation and installation of custom applications. The MFP has a user interface, including a display, and receives a sequence of document processing instruction sequences from one or more users. The processor generates log data corresponding to a logging of each received document processing instruction sequence. The processor sends generated log data to an associated server via a network interface. The network interface receives an application generated by the associated server in accordance with generated log data via the network interface. The processor then installs a received application on the multifunction peripheral along with control indicia on the display. The processor performs a sequence of document processing instructions specified by the received application upon a user selection of the control indicia.

20 Claims, 6 Drawing Sheets

SYSTEM AND METHOD FOR AUTOMATED GENERATION AND INSTALLATION OF MFP APPLICATIONS FROM MONITORED DEVICE USAGE

CROSS-REFERENCE TO RELATED APPLICATIONS

This application claims the benefit of U.S. Provisional Application No. 62/714,194 filed Aug. 3, 2018, which is incorporated herein by reference.

TECHNICAL FIELD

This application relates generally to streamlining device/user interaction for document processing devices. The application relates more particularly to a cloud-based system that collects information from multifunction peripherals as to document processing instruction sequences commonly requested by device users which leads to generation and installation of customized applications on the device, along with generation of touchscreen icon, to provide users with a one touch selection to accomplish their frequently used device sequences.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs are extremely powerful and versatile devices. Today's MFPs employ a powerful, embedded computer, referred to as a controller, to control and monitor device operations. MFPs are configurable in many ways, both in hardware and in software. By way of example, hardware options may include adding a stapling or hole punching unit, adding a collator or adding multiple paper bins.

While MFPs are very powerful, oftentimes users will use only a small fraction of device's capabilities. A subset of frequently used operations may vary among devices. For example, an MFP in a marketing department may frequently be used to make multiple, stapled color printouts for distribution, while an MFP in a human resources department may be frequently be used for sending and receiving faxes.

BRIEF DESCRIPTION OF THE DRAWINGS

Various embodiments will become better understood with regard to the following description, appended claims and accompanying drawings wherein:

DETAILED DESCRIPTION

Figure 1:
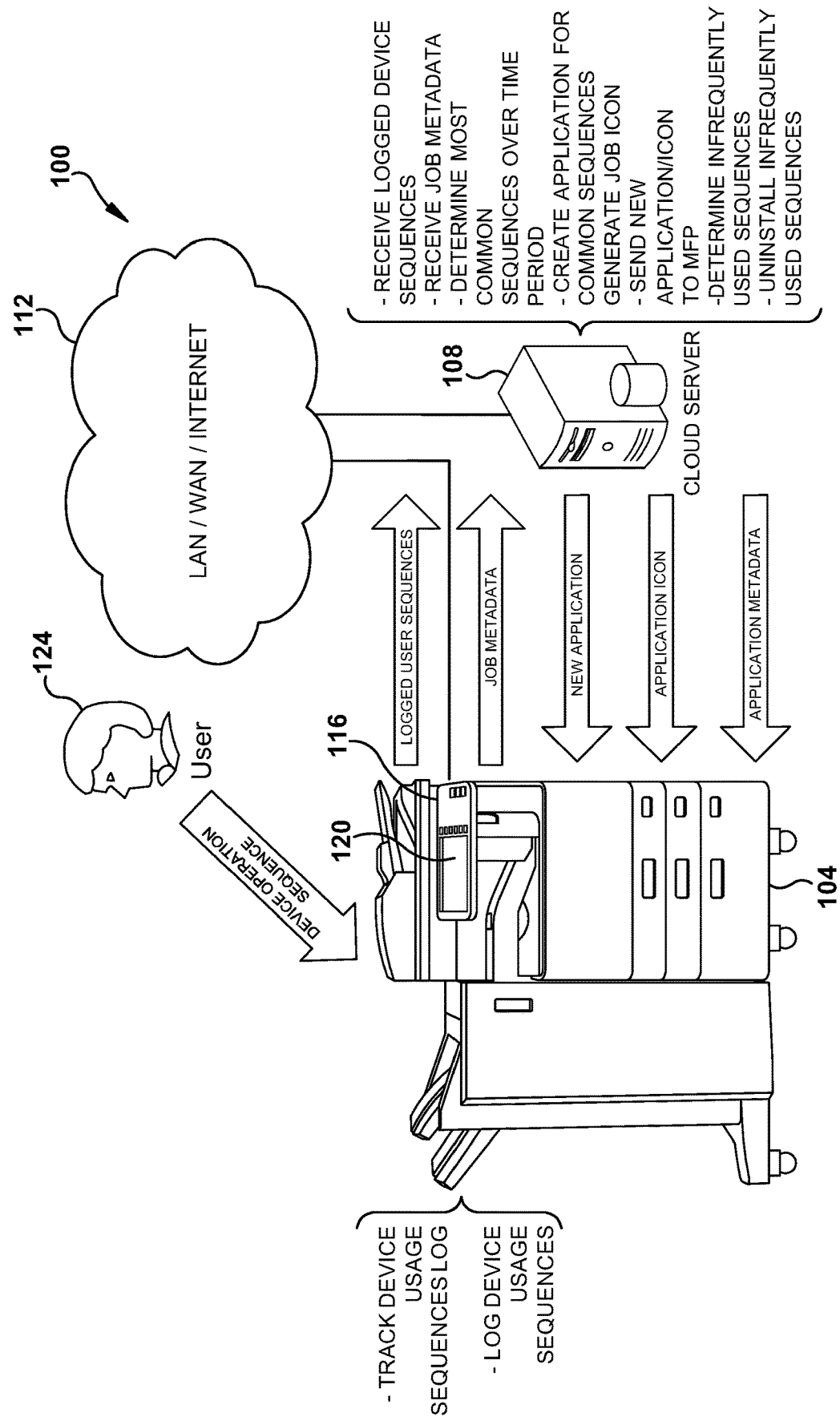
FIG. 1 is an example embodiment of a system for automated generation and installation of MFP applications from monitored device usage.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In accordance with an example embodiment herein, a multifunction peripheral includes an intelligent controller having a processor and associated memory, and scan and print engines operable in accordance with instructions received from the controller. The MFP has a user interface, including a display, and receives a sequence of document processing instruction sequences from one or more users. The processor generates log data corresponding to each received document processing instruction sequence. The processor sends generated log data to an associated server via a network interface. The network interface receives an application generated by the associated server in accordance with generated log data. The processor then installs a received application on the multifunction peripheral along with control indicia on the display. The processor performs a sequence of document processing instructions specified by the received application upon a user selection of the control indicia.

As noted above, a particular MFP, or group of MFPs, may be used more frequently to perform some operations more than others. In these situations, a device can be better streamlined for usage by putting frequently used functions as accessible on a home screen of a touchscreen user interface. MFP functions can be directed by individual applications installed in the device. If a function for a new application, such as an ability to encrypt an electronic document, is currently unavailable and desired, a new application may be secured and installed on the MFP to provide such functionality. This application may include a corresponding, selectable icon that is generated on the touchscreen display. In some embodiments, device administrators can find, purchase and install new applications, such as via an online store, to add device functionality.

Not only might frequently use MFP functions differ from device to device, different document processing instruction sequences may be used on a particular device, or on a particular group of devices. In accordance with example embodiments disclosed herein, an MFP, or a group of MFPs, are monitored to determine which sequence or sequences of instructions are used most frequently. When a sequence is deemed to be under frequent use, an application to generate the entire sequence of operations is generated and installed on one or more devices that would benefit from a selectable entry to complete the entire sequence. The application is generated and a new selectable indicia, such as an icon, appears on the touchscreen display. The indicia can be formed so as to indicate to a user the sequence of operations associated with its selection.

In accordance with the subject application, FIG. 1 illustrates an example embodiment of a system 100 for automated generation and installation of MFP applications from monitored device usage. One or more MFPs, illustrated by MFP 104, are connected to a network server, such as cloud server 108, via network cloud 112. Network cloud 112 is suitably comprised of a local area network (LAN), a wide area network (WAN) which may comprise the Internet, or any suitable combination thereof. MFP includes a user interface 116 that includes touchscreen display 120 for interaction with users, such as user 124. User 124 interacts with user interface 116 to perform a sequence of device operations on MFP 104. Any suitable sequence of operations may be called. By way of example, user 124 may scan a document, make three stapled and hole punched copies, and email an electronic document, such as a PDF, to a departmental secretary. MFP 104, via its embedded controller, logs the instruction sequence, suitably with associated metadata such as who the user is, an identity of the MFP, a location of the MFP and a time of day for the job sequence. Logs of this sequence, and others, are maintained by MFP 104 and periodically, such as daily, weekly or monthly, communicated to cloud server 108. Cloud server 108 analyzes job sequences, metadata and frequency and determines which sequences sufficiently popular at a device or group of devices to merit a dedicated application and selectable indicia to perform all operations in the sequence with a single user interface selection. When a sequence is deemed sufficiently popular, cloud server 108 creates such an application and communicates it to MFP 104 via network cloud 112 for installation. The application can include machine code that is executable on the MFP 104. Once this application is installed, an associated icon is displayed on touchscreen 120 and is selectable by users to perform the complete job sequence.

As will be detailed further below, a selectable indicia is suitably an icon, character data, a graphic, such as motion graphic, or combination thereof sufficient to allow users to readily associate the function sequence when selected.

In addition to the forgoing, cloud server 108 maintains a log of all customized applications that have been generated and installed on MFPs. This allows the cloud server 108 to determine which installed applications may have fell out of favor and have become infrequently used, or relatively infrequently used, and instruct an associated MFP to de-install it or move its associated indicia to a less accessible display screen, such as a sub menu. Any suitable criteria may be used by cloud server 108 to determine which applications are installed, and where or in what order icons or other indicia appear on the user interface. By way of further example, there may be multiple pages of application icons, or a scrollable list of application icons, and those deemed currently most popular may appear first, the list progressing with icons of lower popularity as scrolling is continued.

Figure 2:
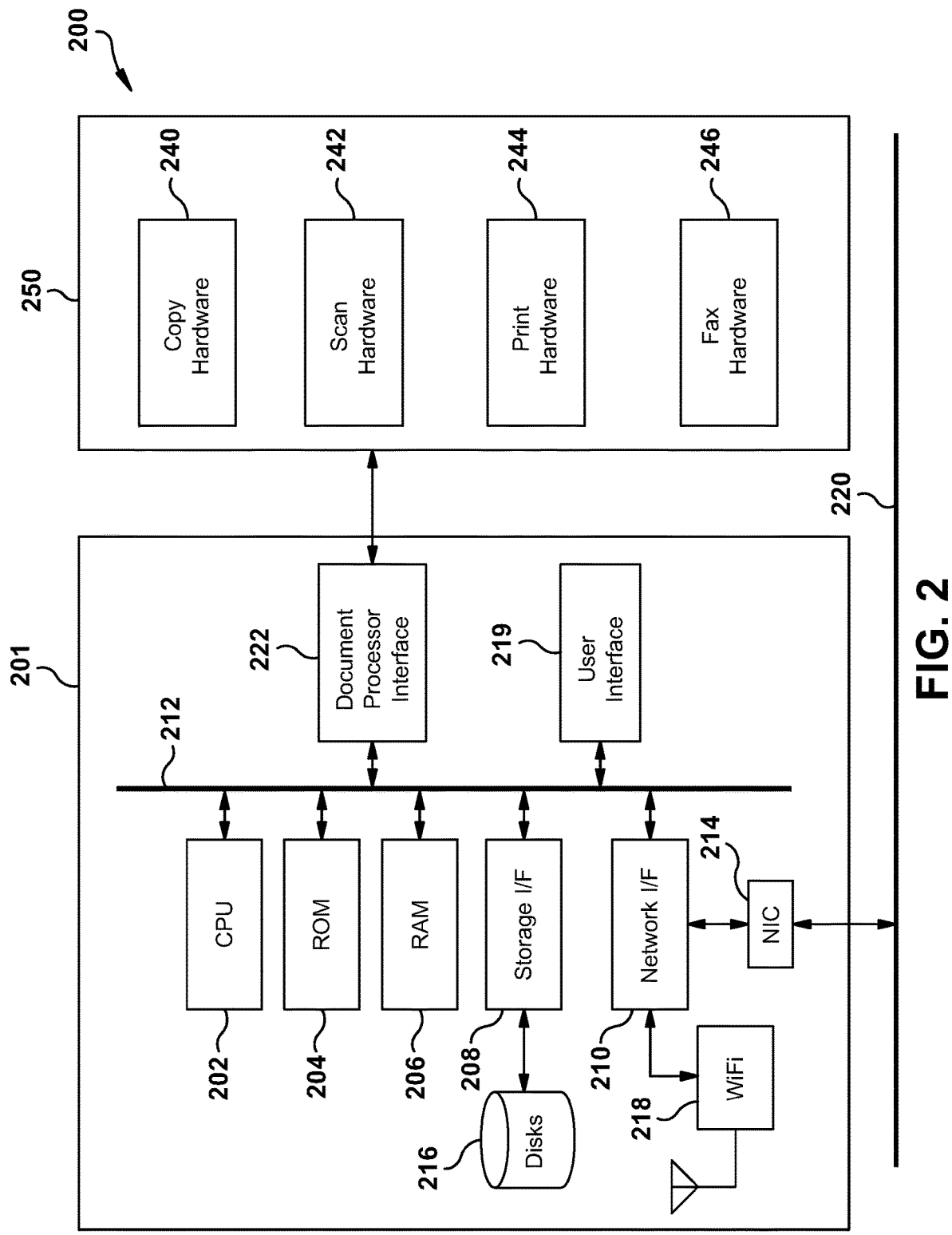
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Thus, an MFP can itself function as a cloud server with the capabilities described herein. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with user interface 219 for interfacing with displays, keyboards, touchscreens, mice, trackballs and the like.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
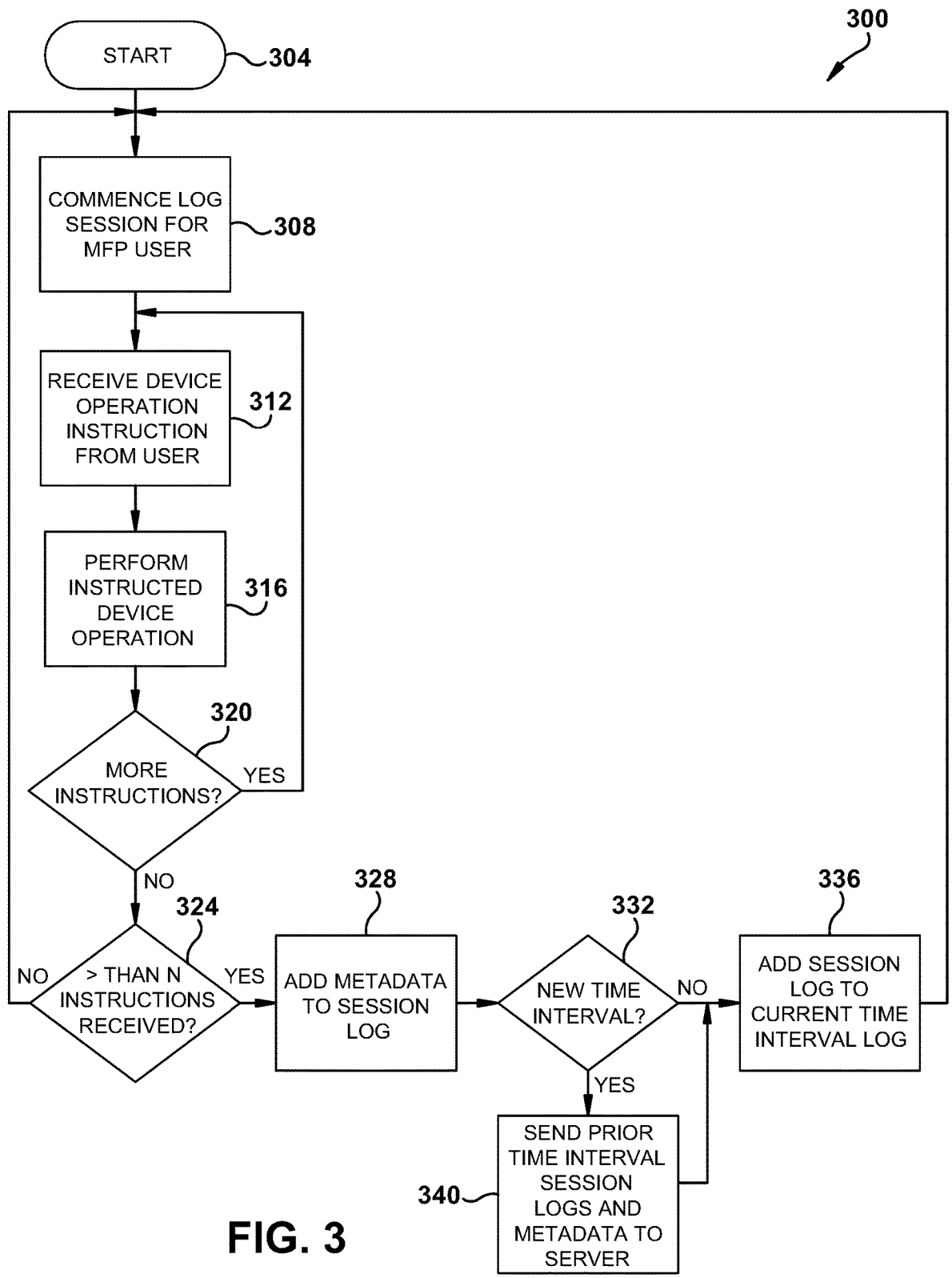
FIG. 3 is a flowchart of an example embodiment of an instruction sequence monitoring, logging and reporting system.

Turning now to FIG. 3, illustrated is a flowchart of an example embodiment of an instruction sequence monitoring, logging and reporting system 300, suitably run on an MFP such as MFP 104 of FIG. 1. The process commences at block 304 and commences a logging session at block 308, such as when a user logs in to an MFP for a document processing session. A device operation instruction is received at block 312, and the instructed operation performed at block 316. If more instructions are determined to follow at block 320, session logging is continued and the process returns to block 312. If not, a determination is made at block 324 to determine if there is a sufficient number of instructions in a sequence to merit consideration for generation of a customized application. A number of instructions could be as low as two, but a cutoff may be any suitable minimum as may be determined by an administrator. If popularity criteria have been met, metadata associated with the logged sequence is added at block 328. A check is made at block 332 to determine if an ongoing reporting interval is still open. If so, the log information is added to the ongoing sessions log file at block 336. If a new interval is started, the prior interval log information is communicated to the server at block 340 before the current log session is commenced at block 336. From there, the system returns to block 308 and awaits another user instruction sequence.

Figure 4:
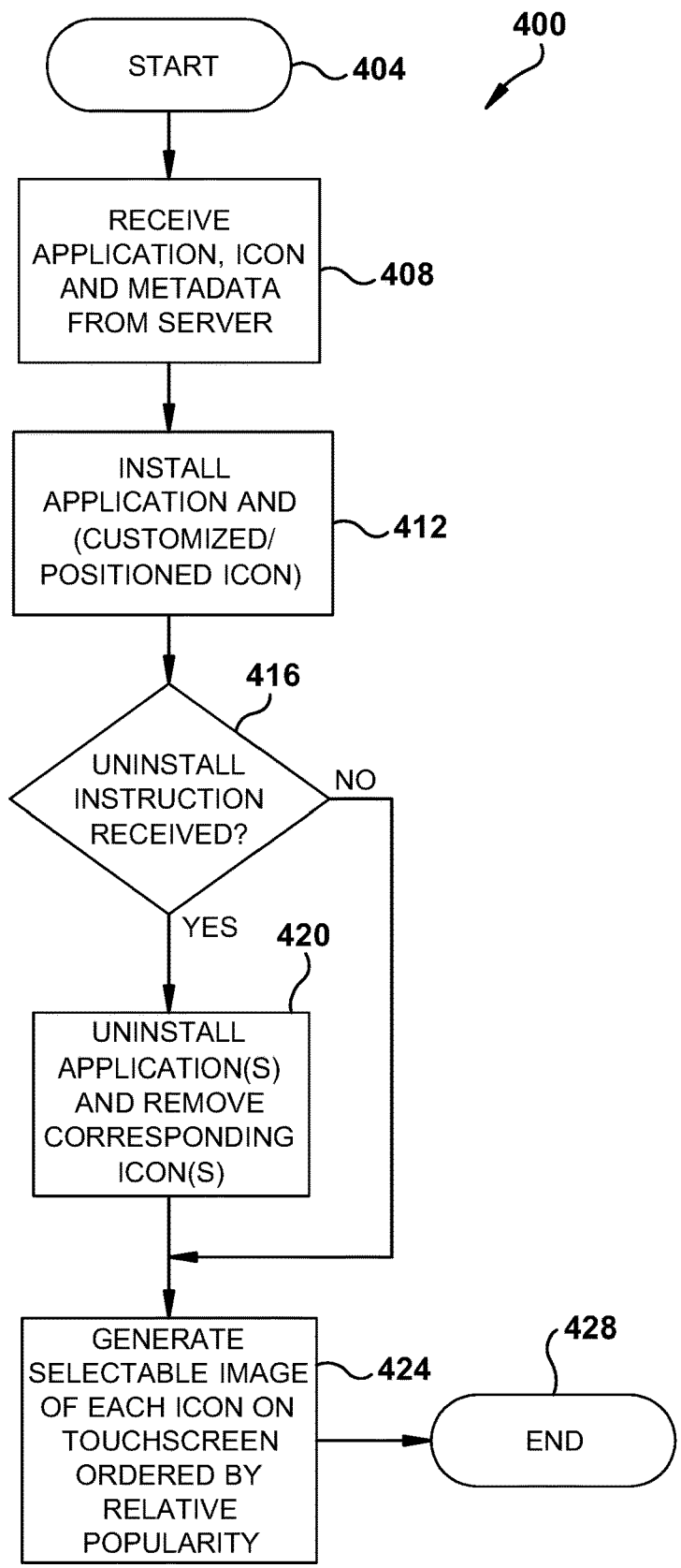
FIG. 4 is a flowchart of example embodiment of an installation of a new application on a multifunction peripheral.

FIG. 4 is a flowchart 400 of an example embodiment of an installation of a new application on an MFP such as MFP 104 of FIG. 1. The process commences at block 404 and proceeds to block 408 wherein an application, icon and metadata is received from a networked cloud server. Metadata may include data as to relative popularity of the associated application for placement selection by the MFP, or alternatively placement information determined by the cloud server. The installation, and associated icon, is installed at block 412. If an uninstall instruction has also been received as determined by block 416, the associated application is uninstalled at block 420. If no uninstall instruction is received, or once an application has been uninstalled, one or more selectable images associated with applications is generated and displayed, such as positioned by relative popularity, at block 424. The process suitably ends at block 428.

Figure 5:
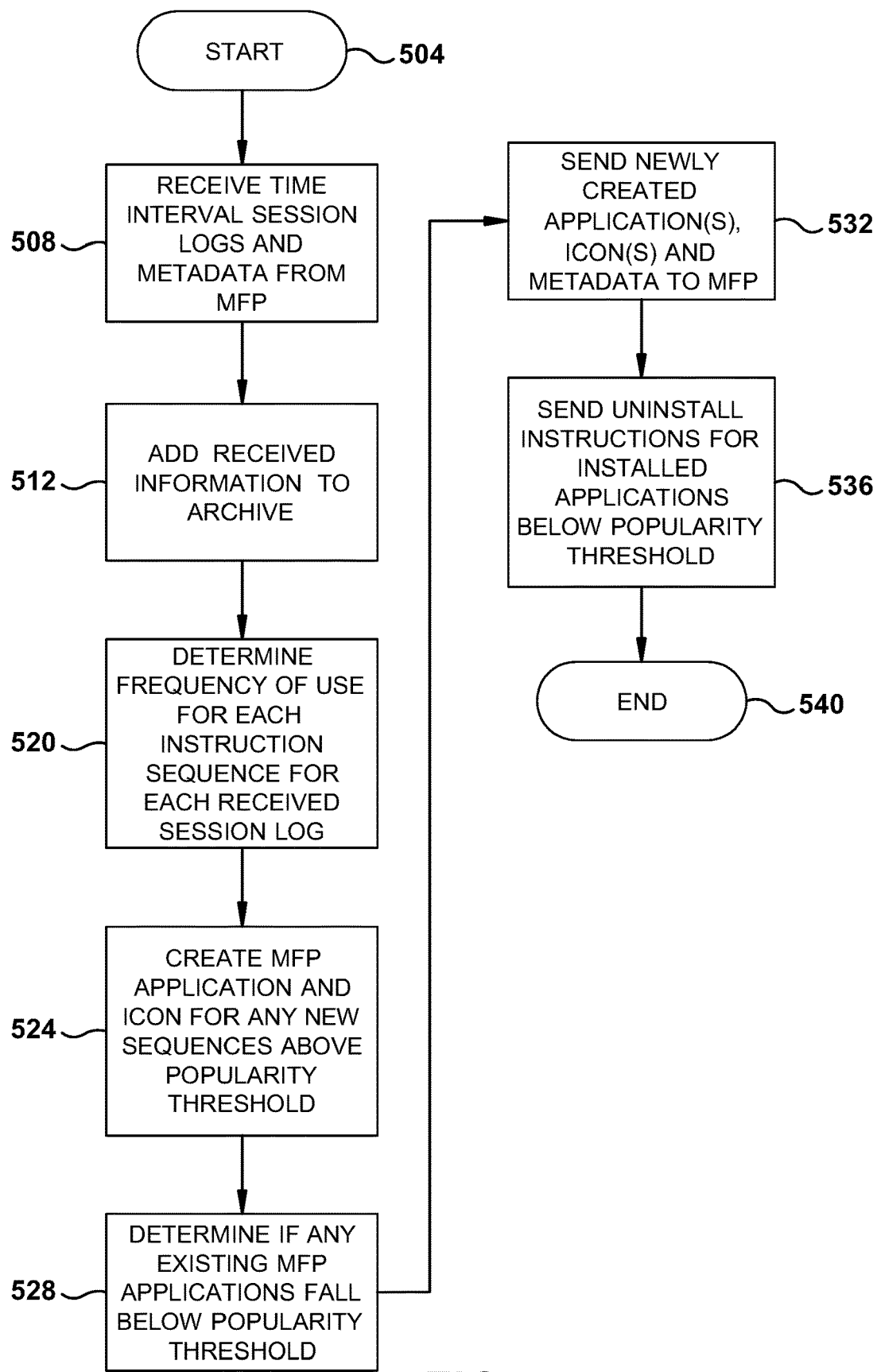
FIG. 5 is a flowchart of an example embodiment of a system for selectively removing less popular applications installed on multifunction peripherals.

FIG. 5 is a flowchart 500 of an example embodiment of a system for selectively removing less popular applications installed on MFPs, suitably accomplished via a server such as cloud server 108 of FIG. 1. The process commences at block 504 and proceeds to block 508 wherein time interval session logs and associated metadata is received from one or more MFPs. Received information is added to a stored archive at block 512. Sequence popularity is determined, such as a frequency of usage, for each received session log at block 520 and an application is created for popular sequences, such as those over a selected usage threshold, at block 524. A determination as to whether an MFP's existing applications have become less popular is made at block 528. A newly created application and its associated metadata and icon is sent to an MFP at block 532. Instructions for de-installation of relatively unpopular applications are sent at block 536, and the process ends at block 540.

Figure 6:
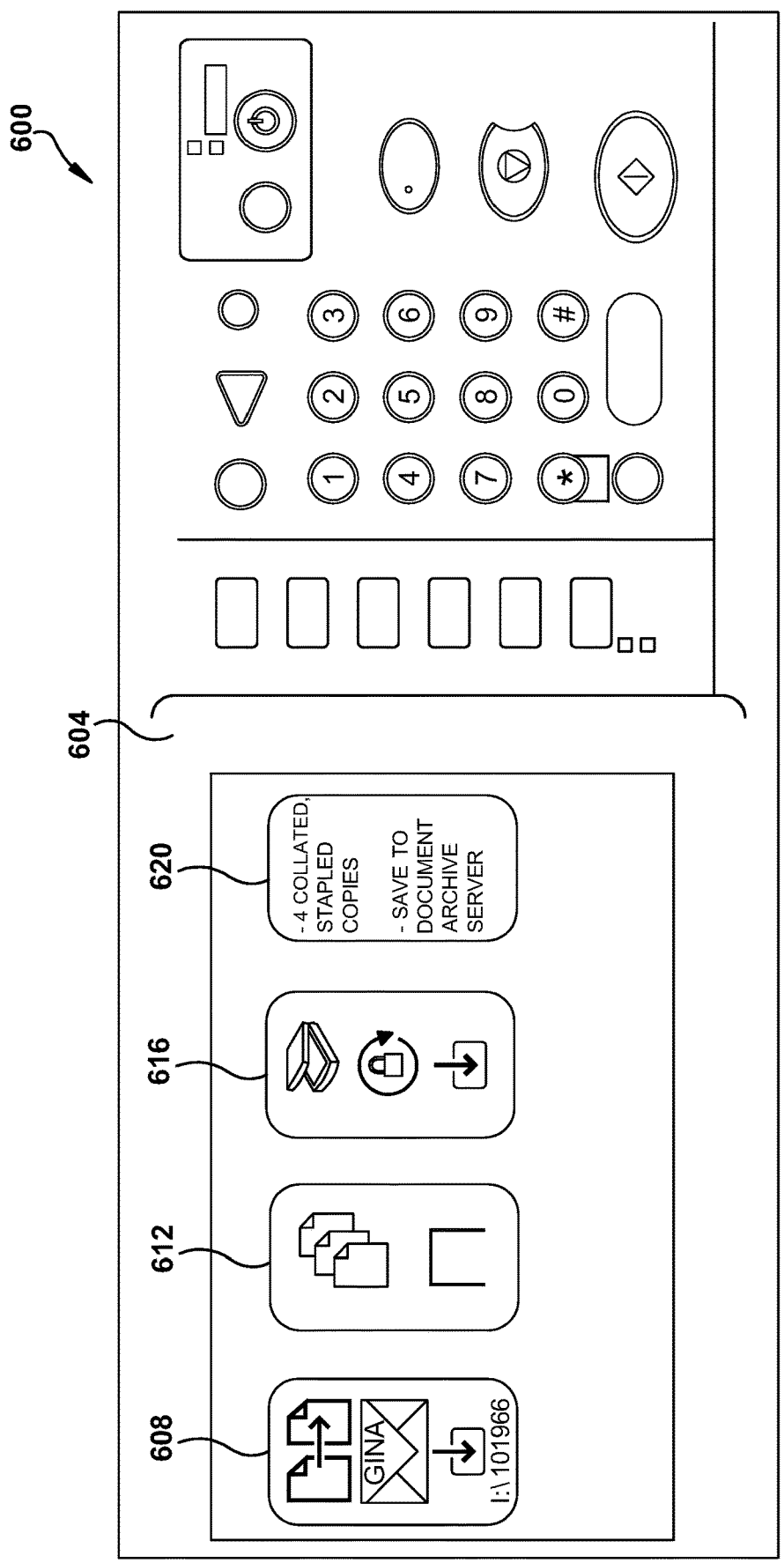
FIG. 6 is an example embodiment of a customized user interface including selectable indicia for frequently used instruction sequences.

FIG. 6 illustrates an example embodiment of a customized user interface 600 that includes a touchscreen 604. Illustrative, selectable icons 608, 612, 616 and 620 are displayed on touchscreen 604. Each illustrated icon is associated with a unique, installed application created to perform a popular device operation sequence. Icons can advantageously be provided with graphical, text or other visual indicia that indicates to a user a sequence that will be completed upon selection. Icon 608 illustrates an example wherein its selection results in a document being printed, with an electronic copy mailed to Gina and saved to a specified folder.

Icon 612 illustrates an example wherein three printouts of a document are made and stapled. Icon 616 illustrates an example wherein a document is copied, encrypted and saved to archive. Icon 620 provides a textual description as to what will be done when it is selected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
an intelligent controller including a processor and associated memory;
a scan engine operable in accordance with instructions received from the controller;
a print engine operable in accordance with instructions received from the controller;
a network interface; and
a user interface, including a display, configured to receive a document processing instruction sequence from a device user,
wherein the processor is configured to perform sequential document processing operations as specified by the document processing instruction sequence;
wherein the processor is configured to generate log data corresponding to the document processing instruction sequence,
wherein the processor is further configured to send generated log data to an associated server via the network interface,
wherein the network interface is configured to receive an application generated by the associated server in accordance with generated log data via the network interface,
wherein the processor is further configured to install a received application on the multifunction peripheral,
wherein the processor is further configured to generate a control indicia on the display, and
wherein the processor further is configured to re-execute the sequence of document processing instructions specified by the received application upon a user selection of the control indicia.

2. The multifunction peripheral of claim 1 wherein the processor is further configured to send log data to the server in accordance with device processing instructions logged over a specified time interval.

3. The multifunction peripheral of claim 1 wherein the network interface is further configured to receive an application de-installation instruction generated by the server in accordance with generated log data, and wherein the processor is further configured to uninstall an application from the multifunction peripheral in accordance with a received de-installation instruction.

4. The multifunction peripheral of claim 1 wherein the document processing instruction sequence specified by the received application includes two or more of scanning a tangible document, printing an electronic document, storing an electronic document file, faxing an electronic document file or e-mailing an electronic document file.

5. The multifunction peripheral of claim 1 wherein the application is comprised of machine code executable by the processor.

6. The multifunction peripheral of claim 1 wherein the network interface is further configured to receive at least a second application generated by the associated server in accordance with generated log data,
wherein the processor is further configured to install each received application on the multifunction peripheral,
wherein the processor is further configured to generate unique control indicia on the display for each received application, and
wherein the processor is further configured to perform a unique document processing instruction sequence specified by each received application upon a user selection of corresponding control indicia.

7. The multifunction peripheral of claim 1 wherein the indicia is illustrative of document operations to be performed by selection thereof.

8. The multifunction peripheral of claim 7 wherein the network interfaces is further configured to receive the indicia from the server.

9. A method comprising:
controlling a multifunction peripheral scan engine in accordance with instructions received from a controller including a processor and associated memory;
controlling a print engine of the multifunction peripheral in accordance with instructions received from the controller;

receiving, into a user interface of the multifunction peripheral, a document processing instruction sequence, each instruction sequence received from one or more device users;

executing each document processing instruction of the document processing instruction sequence;

generating, via the processor, log data corresponding to the document processing instruction sequence;

sending generated log data to an associated server via a network interface;

receiving an application generated by the associated server in accordance with generated log data via the network interface;

installing a received application on a multifunction peripheral;

generating a control indicia on the display; and re-executing the sequence of document processing instructions specified by the received application upon a user selection of the control indicia.

10. The method of claim 9 further comprising sending log data to the server in accordance with device processing instructions logged over a specified time interval.

11. The method of claim 9 further comprising to receiving an application de-installation instruction generated by the server in accordance with generated log data and uninstalling an application from the multifunction peripheral in accordance with a received de-installation instruction.

12. The method of claim 9 further comprising receiving the document processing instruction sequence specified by the received application inclusive of two or more of scanning a tangible document, printing an electronic document, storing an electronic document file, faxing an electronic document file or e-mailing an electronic document file.

13. The method of claim 9 wherein the application is comprised of machine code executable by the processor.

14. The method of claim 9 further comprising:

receiving at least a second application generated by the associated server in accordance with generated log data;

installing each received application on the multifunction peripheral;

generating unique control indicia on the display for each received application; and performing a unique document processing instruction sequence specified by each received application upon a user selection of corresponding control indicia.

15. The method of claim 9 wherein the control indicia is illustrative of document operations to be performed by selection thereof.

16. The method of claim 15 further comprising receiving the control indicia from the server via the network interface.

17. A system comprising:

a processor and associated memory; and a network interface configured to receive log data corresponding to a logging of a plurality of user instructed document processing instruction sequences executed in a multifunction peripheral, wherein the network interface is further configured to receive metadata corresponding to each document processing instruction sequence, wherein the processor is configured to determine popularity of each document processing instruction sequence from its associated metadata, wherein the processor is further configured to selectively generate an application executable in the multifunction peripheral to replicate, in the multifunction peripheral, each document processing instruction in a document processing instruction sequence in accordance with its determined popularity, and wherein the processor is further configured to send the multifunction peripheral application to the multifunction peripheral via the network interface.

18. The system of claim 17 wherein the processor is further configured to generate an icon corresponding to the multifunction peripheral application and send the icon to the multifunction peripheral via the network interface.

19. The system of claim 18 wherein the icon includes illustrative of document operations to be performed by the multifunction peripheral application.

20. The system of claim 17 wherein the processor is further configured to send a plurality of unique multifunction peripheral applications to the multifunction peripheral along with data indicative of relative popularity of the applications.

* * * * *